United States Patent [19]
Kato et al.

[11] Patent Number: 4,902,319
[45] Date of Patent: Feb. 20, 1990

[54] GAS FILTER

[75] Inventors: Yoshihisa Kato, Toyota; Takashi Ogawa, Kariya; Hideo Tsukazaki, Toride, all of Japan

[73] Assignees: Kuniaki Watanabe; Hidetoshi Nakajima, both of Japan

[21] Appl. No.: 333,224

[22] Filed: Apr. 5, 1989

[30] Foreign Application Priority Data

Apr. 14, 1988 [JP] Japan .................................. 63-49385

[51] Int. Cl.⁴ ............................................. B01D 46/00
[52] U.S. Cl. ........................................ 55/523; 60/311
[58] Field of Search ...................... 55/DIG. 30, 523; 60/311; 428/116

[56] References Cited
FOREIGN PATENT DOCUMENTS
252800 11/1986 Japan ...................................... 55/523

Primary Examiner—Bernard Nozick
Attorney, Agent, or Firm—Lorusso & Loud

[57] ABSTRACT

In a gas filter, a ceramic honeycomb body has a plurality of gas passages. A sealing glass film is attached to the gas exit end face of the ceramic honeycomb body. A fine ceramic film is coated on the inside surface of each gas passage. A sealing member is adhered to the gas inlet and end face of the ceramic honeycomb body. The sealing member is made of a fine ceramic material the pores of which are smaller than the pores of the fine ceramic films. The sealing member has a gas channel in its end face at the gas inflow end such that gas which is introduced through the gas channel may pass into the gass passages from the exterior of the ceramic honeycomb body.

5 Claims, 2 Drawing Sheets

GAS FILTER

This invention relates to a gas filter device which is suitable for filtering dry gas for use in the manufacture of semiconductors.

As is well known, various gases are used for the purpose of making semiconductor devices. Particularly nowadays, highly integrated IC devices such as LSI and VLSI devices are produced. The circuit patterns are minute. Therefore particles having a size of 0.01 microns as well as particles having a size of 0.05 microns must be removed from an etching gas.

A filter for such an etching gas is conventionally made of a glass fiber material in the shape of a sheet or cylinder, or a laminated material in the shape of a disc plate, consisting of Teflon (Registered Trade Mark) membranes, or a pleated element.

However, pore sizes in the glass fiber material are not uniform. Therefore, the glass fiber material is not suitable for a filter to surely eliminate particles whose size is larger than a certain size.

If a binder is used to form the glass fiber into the shape of a sheet or cylinder, some kinds of gas will react with the binder. Thus, a binder cannot be used. Without a binder, glass fiber easily shifts, and captured particles escape the filter and flow downstream. Furthermore, metal particles (such as $Na^+$, $B^+$, etc) in the glass fiber material can be picked up by the gas flow and contaminate the semiconductor devices.

In the case of a filter made of Teflon (Registered Trade Mark) membranes, a static electrical charge easily occurs. Foreign material is easily caught on the primary side of the filter by static electricity. This foreign material cannot be released by means of clean air. When the filter is used for a long time, the foreign material is released from the secondary side of the filter. As a result, defects in semiconductor devices are easily formed.

The filtration rate of a gas filter has a large influence on the defect percentage of IC's. Thus an improved gas filter is required. However, the above mentioned prior art gas filters cannot satisfy this requirement.

On the other hand, Japanese Laid-Open, Utility Model No. 61-19115 discloses a gas filter with a ceramic film. The gas filter comprises a ceramic honeycomb body having a plurality of gas passing holes coated on the inside with fine ceramic films.

In the case of this gas filter, a Teflon (Registered Trade Mark) plate sealing the end face at the gas inflow side of the ceramic honeycomb body, and a support member made of metal, are required. The construction of the gas filter is complicated. Each member needs strict dimensional accuracy. Otherwise perfect sealing is not attained. Moreover, when the Teflon (Registered Trade Mark) plate deteriorates from long use, the gas to be filtered is contaminated.

An object of this invention is to provide an improved gas filter which can be used effectively to filter out fine particles and that has a long service life and high reliability.

According to this invention, a gas filter is provided which has a ceramic honeycomb body having a plurality of gas passing holes, a sealing glass film attached to an end face of the ceramic honeycomb body at its gas outflow side, a fine ceramic film coated on the inside surface of each gas passing hole, a sealing member adhered to an end face of the ceramic honeycomb body at its gas inflow side, the sealing member being made of a fine ceramic material the pores of which are smaller than the pores of the fine ceramic films, the sealing member having a gas flow channel in its end face at the gas inflow side such that gas which is introduced through the gas channel may pass into the gas passing holes from the outside of the ceramic honeycomb body.

Specific embodiments of a gas filter in accordance with the present invention will now be described in detail by way of example with reference to the accompanying drawings in which.

Figure 1:
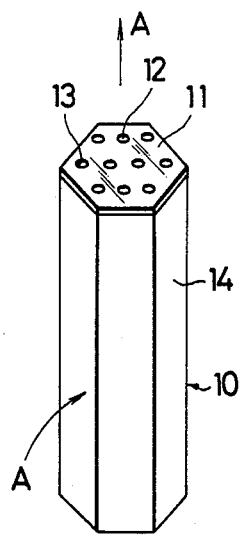
FIG. 1 is a perspective view of a gas filter according to the present invention.

With reference now to the accompanying drawings, the gas filter comprises a ceramic honeycomb body 10 or 20 having a plurality of gas passing holes 12 or 22, a sealing film 11 or 21 attached to an end face of the ceramic honeycomb body at its gas outflow side, fine ceramic films 13 or 23 coated inside of the gas passing holes 12 or 22, and a sealing member 17 or 27 adhered to the end face of the ceramic honeycomb body 10 or 20 at its gas inflow side by means of an inorganic adhesive. The sealing film 11 is made of an inorganic adhesive material such as glass. The sealing film 11 and the inorganic adhesive for the sealing member 17 or 27 are preferably made of a special glass consisting essentially of 72% $SiO_2$, 14% $Al_2O_3$, 4% MgO, 4.5% CaO, 3% $K_2O$ and 2.5% NaO. The sealing member 17 or 27 is made of a fine ceramic material, the pores of which are smaller than pores of the ceramic film 13 or 23. The sealing member 17 or 27 has a gas passing channel 18 or 28 in its end face at its gas inflow side. The gas is introduced through the gas passing channel 18 or 28. When the gas passes into the gas passing holes 12 or 22 from the outside of the ceramic honeycomb body 10 or 20, the gas is filtered.

A relatively coarse ceramic film 25 preferably coats to the outside of the ceramic honeycomb body 10 or 20. The particles of the coarse ceramic film 25 are more coarse than those of the ceramic film 13 or 23 coating the inside of the gas passing holes 12 or 22. The sealing member 17 or 27 is preferably made of $Al_2O_3$ the purity of which is 99.5% or more.

The gas is introduced through the gas channel 18 or 28, and passes into the longitudinal gas passages 12 or 22 from the outside of the ceramic honeycomb body 10 or 20. The gas is filtered by the fine ceramic films 13 or 23 coated on the inside of the gas passing holes 12 or 22. The sealing glass film 11 or 21 seals the end face of the ceramic honeycomb body 10 or 20 at the gas outflow side, so that the filtrate flows out only through the gas passing holes 12 or 22.

FIG. 1 shows a hexagonal ceramic honeycomb body (hereinafter called "a ceramic body") having a plurality of gas passing holes 12 formed at regular intervals. A fine ceramic film 13 is formed on the inside of each gas passing hole 12. Gas A is filtered when it flows into the gas passing holes 12 from outside of the ceramic body 10. The filtrate flows upwardly through the gas passing holes 12 and out of the filter.

The ceramic films 13 having a high filtering ability have a wide filtering area so that the flow rate of the gas, after filtering, is not changed from that of pre-filtering. In the filtering operation, the flow of gas is thus maintained without any gas accumulation occurring. It is very easy to clean the filter or to remove particles attached to the filter. In order to remove such particles, clean gas is passed through the filter.

Ceramic films made of fine ceramic particles are formed on the inside of the gas passing holes 12. Since ceramic particles of desired sizes are easily available, a ceramic film made of fine ceramic particles of 0.1 microns or less can easily be produced.

The ceramic a body 10 has a honeycomb construction. It can receive heavy load in the longitudinal direction when it is inserted in a casing 15 (see FIG. 5) and can absorb shocks from the outside.

A sealing glass film 11 is coated on the end face of the ceramic body 10 at the gas outflow side. The sealing glass film 11 prevents the gas from flowing out except through the gas passing holes 12. Thus, filtering through the ceramic films 13 is effected.

Figure 2:
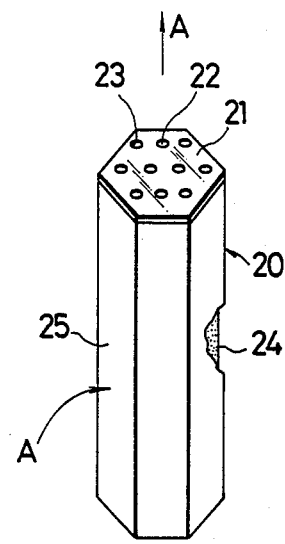
FIG. 2 is a perspective view showing an alternative gas filter according to the present invention.

FIG. 2 shows an embodiment in which a ceramic film 25 is coated on an outside surface 24 of a ceramic body 20. The ceramic film 25 is more coarse than the ceramic film 23 coated on the inside of the gas passing holes 22. In this embodiment, the filtering operation is carried out in two steps, first through the ceramic film 25 and then through the ceramic films 23 so that foreign materials are effectively removed from the gas.

Figure 3:
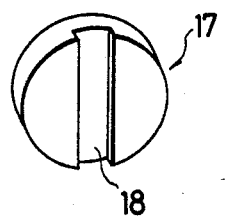
FIG. 3 is a perspective view showing a sealing member of a gas filter as shown in FIGS. 1 or 2.
Figure 4:
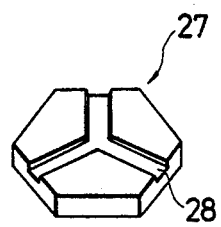
FIG. 4 is a perspective view showing an alternative sealing member of a gas filter as shown in FIGS. 1 or 2.

FIGS. 3 and 4 show two different forms for the sealing member. The sealing member 17 shown in FIG. 3 is of a disc shape. The sealing member 17 is made of a fine ceramic material whose pores are smaller than those of the ceramic films 23. A gas channel 18 to pass the gas is provided on the gas inflow side of the sealing member 17. For example, $Al_2O_3$ (alumina) the purity of which is 99.5% or more can be used to form the sealing member 17.

The sealing member 27 in FIG. 4 is hexagonal in shape and is made of fine ceramic similar to the sealing member 17 shown in FIG. 3. A gas channel 28 is provided on its end face on the gas inflow side. The gas passing channel 28 is a three way channel, the intersection of individual channels lying at the center of the sealing member.

Figure 5:
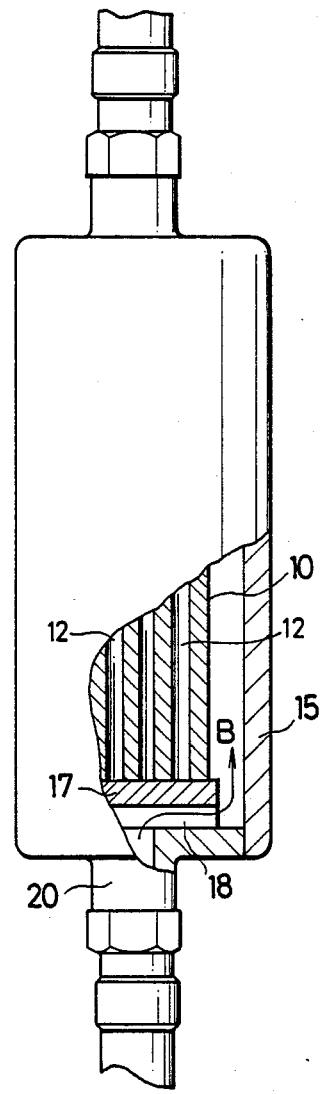
FIG. 5 is a view, partly in cross section, showing a filtering device incorporating a gas filter according to the present invention.

FIG. 5 shows a filtering device equipped with a gas filter as shown in FIG. 1 and having a sealing member 17 as shown in FIG. 3. The ceramic body 10 and the sealing member 17 are housed in a casing 15. The end face of the ceramic body 10 on the gas inflow side and the end adjacent face of the sealing member 17 are adhered together with glass. The glass itself forms a glass film on the end face of the ceramic body 10 on the gas inflow side.

A sealing member such as the member 17 may be united with various types of ceramic structures similar to the body 10, to form a gas filter in accordance with this invention.

A holding member 20 is attached to the casing 15 in an airtight fashion. The holding member 20 presses against the end face of the sealing member 17 on the gas inflow side. For example, a male screw portion of the holding member 20 is screwed into a female screw portion of the casing 15. The holding member 20 also presses the sealing member 17 against the end face of the ceramic structure body 10. The holding member may be attached to the casing 15 by any other attaching method.

The gas to be filtered, which is for example $N_2$ (nitrogen) gas, passes through the gas channel 18 as indicated by arrow B so as to be introduced to a space between the outside surface of the ceramic body 10 and the inside surface of the casing 15. The $N_2$ gas is filtered as it flows into the gas passing holes 12 from the outside of the ceramic body 10 and through the pores of the body 10 and the ceramic films 13.

As a gas filter as described with reference to FIGS. 1 to 4 comprises the sealing member 17 or 27, the number of members constituting the filter is reduced, and strict dimensional accuracy of the members can be attained. Excellent sealing between the ceramic honeycomb body 10 or 20 and the sealing member 17 or 27 is attained. Therefore, in use of the filter, the gas is effectively filtered. As the sealing member 17 or 27 and the ceramic honeycomb body 10 or 20 are adhered by means of glass, the sealing between them is very effective.

The sealing glass film 11 or 21 is attached to the end face at the gas outflow side of the ceramic honeycomb body 10 or 20. Thus, the filtrate flows out only through the gas passing holes 12 or 22 and the gas is effectively filtered.

The sealing member 17 or 27 is preferably prepared as a module or unit, so that it can be applied to various types of ceramic bodies 10.

Using a filter as described with reference to the accompanying drawings, very fine particles in a gas can be effectively eliminated. Such a filter is suitable for use in a filtering device which filters dry gas for use in the manufacture of semiconductors.

We claim:

1. A gas filter, for mounting in a casing having a gas inlet and a gas outlet, comprising:
   a ceramic honeycomb body having a plurality of interior gas passages, a gas permeable exterior wall and gas inlet and gas outlet ends;
   a sealing glass film attached to the face of the gas outlet end of the ceramic honeycomb body said sealing glass film having a plurality of openings allowing filtered gas to exit said passages;
   a fine ceramic porous film coating on the inside surface of each of said gas passages;
   a porous sealing member adhered to the face of the gas inlet end of the ceramic honeycomb body to seal off said gas passages, the sealing member being made of a fine ceramic material the pores of which are smaller than the pores of said fine ceramic film coatings, the sealing member having a gas flow channel in its side facing outwardly of said body so that gas which is introduced through the gas flow channel may pass into said gas passages through said exterior wall of the ceramic honeycomb body when said filter is mounted within the casing.

2. The gas filter of claim 1 wherein said fine ceramic film is composed of ceramic particles 0.1 microns or less.

3. A gas filter according to claim 1, wherein the sealing member is made of $Al_2O_3$ the purity of which is 99.5% or more.

4. A gas filter according to claim 1 further comprising a ceramic film made of a relatively coarse ceramic material adhered to the outside of the ceramic honeycomb body, the coarse ceramic film being more coarse than the ceramic films coated on the insides of the gas passages.

5. A gas filter according to claim 4, wherein the sealing member is made of $Al_2O_3$ the purity of which is 99.5% or more.

* * * * *